United States Patent [19]

McElhinney et al.

[11] 3,845,998

[45] Nov. 5, 1974

[54] WINDSHIELD WIPER LINKAGE BUSHING

[75] Inventors: Warren W. McElhinney, Birmingham, Mich.; James C. Beaudette, Essex, Ontario, Canada

[73] Assignee: Chrysler Corporation, Highland Park, Mich.

[22] Filed: Dec. 22, 1972

[21] Appl. No.: 317,855

[52] U.S. Cl. .............. 308/36.1, 308/238, 308/15
[51] Int. Cl. ................... F16c 33/74, F16c 27/00
[58] Field of Search ...... 308/36.1, 238, 15; 287/93; 64/27 NM; 151/41.75; 85/8.8

[56] References Cited
UNITED STATES PATENTS

| | | | |
|---|---|---|---|
| 2,558,589 | 6/1951 | Skolfield | 64/27 NM |
| 2,970,869 | 2/1961 | Thomas | 308/238 |
| 2,976,555 | 3/1961 | Bartoo | 15/250.27 |
| 3,164,054 | 1/1965 | Biesecker | 287/93 |
| 3,298,762 | 1/1967 | Peck et al. | 308/36.1 |
| 3,330,605 | 7/1967 | Jasmand | 308/36.1 |

Primary Examiner—Charles J. Myhre
Assistant Examiner—Frank Susko
Attorney, Agent, or Firm—Talburtt & Baldwin

[57] ABSTRACT

A bushing especially suitable for interconnecting the motion transmission linkage in a windshield wiper system. The bushing comprises a resilient body adapted to be carried in an aperture of one link and having a bore in which is journaled a shaft or stud formed on a second member. The bushing has an integrally formed cap at one end on which lubricant may be retained and a seal integrally formed in its opposite end. The cap and the seal portions cooperate to keep water, dust and other injurious contaminates from the bushing wear surfaces.

3 Claims, 7 Drawing Figures

3,845,998

WINDSHIELD WIPER LINKAGE BUSHING

BACKGROUND OF THE INVENTION

The present invention relates to a novel fastening device or bushing adapted to be applied to an apertured member. The bushing of this invention finds special application in the interconnection of automotive windshield wiper linkage wherein significant pivotal and canting movement occurs as between individual linkage members.

Current windshield wiper linkage design places severe requirements on the fastening systems used to interconnect the linkage. Thus, in any given windshield wiper system several relatively long and heavy rods are employed, which, during use, undergo pivotal, rotational and canting motions relative to each other. Obviously, such movement places severe loads on the members interconnecting such linkage. Moreover, the location of the windshield wiper linkage in the vehicle causes it to be subject to constant exposure to moisture in the form of rain and snow, as well as to dirt, grease and other substances detrimental to motion accommodating fasteners. Furthermore, due to the space limitation and number of fasteners which must be employed, it is important that the size of the fastening arrangement for linkage interconnection be kept to a minimum.

Bushing arrangements employed heretofore in windshield wiper systems presented difficulties since they were composed of a number of components any one of which alone, or in combination, could present problems. For example, the most successful of presently known bushing arrangements is exemplified by U.S. Pats. Nos. 3,702,718 and 3,316,033 which require the provision of a bearing retaining cover arrangement which itself must then be retained on a linkage member and which must be closely aligned with apertures in the bearing and link members. It can be appreciated that the handling of a plurality of small parts which must be closely aligned can present difficulties in assembly, especially as each component has its own dimensional tolerance variations.

SUMMARY OF THE INVENTION

It is an object of this invention to provide a novel one-piece fastening arrangement or bushing for connecting the extremity of one of the motion transmission links of a windshield wiper system with a stud secured to the extremity of a second motion transmission link.

A further object is to provide a novel bushing which will securely interconnect such linkage, permit rotational, pivotal and canting therebetween and prevent moisture and dirt from contacting the wear surfaces of the bushing.

A still further object is to provide a bushing adapted to be easily applied to an apertured member and which will securely retain a stud portion of a second member and which can be economically manufactured in one piece from suitable tough resilient materials.

These, as well as other objects, are achieved by the provision of a bushing constructed of a resilient material such as polyurethane which can easily be snapped into an apertured member. Retaining means, such as an annular groove about the outer surface of the bushing, are provided to secure the bushing to the apertured members, and the bushing contains a central bore extending in an axial direction only partially through the bushing to provide a chamber having only one opening. A seal is provided adjacent this opening such that when a member is journaled in the chamber the seal is in sealing engagement therewith and prevents the passage of water, dirt and other contaminates to the interior of the bushing where they would interfere with wear surfaces.

DESCRIPTION OF THE PREFERRED EMBODIMENT

Figures 5, 6:
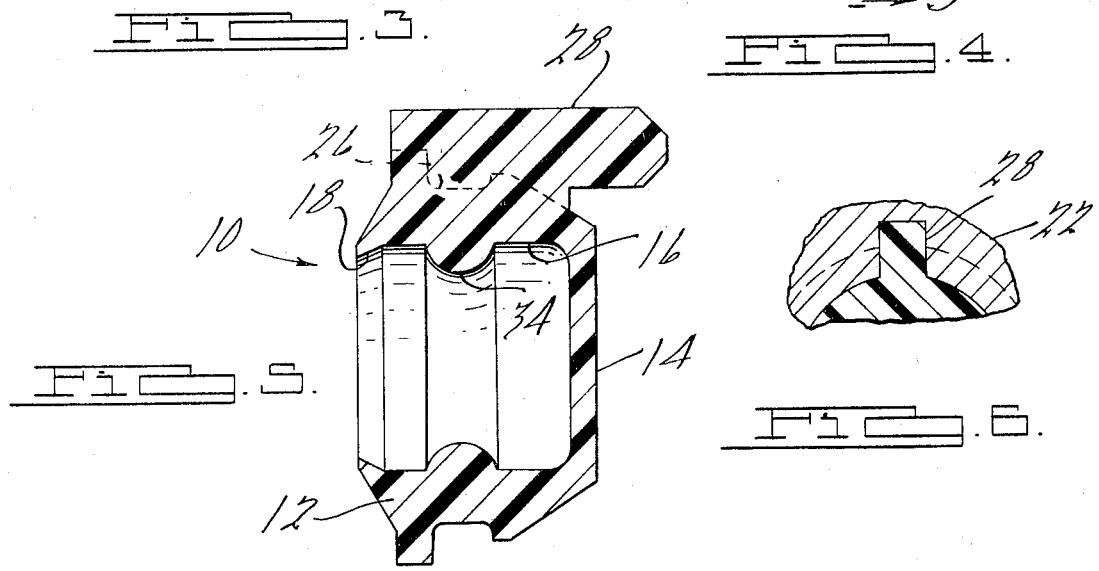
FIG. 5 is a cross-sectional view taken along line 5—5 of FIG. 4.
FIG. 6 is a sectional view taken along line 6—6 of FIG. 1.

With reference to FIG. 5, the bushing of this invention is indicated generally by reference numeral 10 and has two oppositely disposed end portions 12 and 14. An axially disposed bore 16 extends through the end portion 12 and terminates within the bushing so that the bushing end portion 14 functions as an integrally formed cap of the bore.

A seal surface 18 is provided in end portion 12 of the bushing and, in the preferred form, the seal surface 18 constitutes part of the wall of the bore 16. As shown with particular reference to FIG. 5, the bore 16 is of increasing diameter within end portion 12 so as to provide a tapered or ramp-like seal surface 18. It will be apparent, however, that the seal surface could be provided by means of an annular rib projecting from the bore wall, if so desired.

Figure 1:
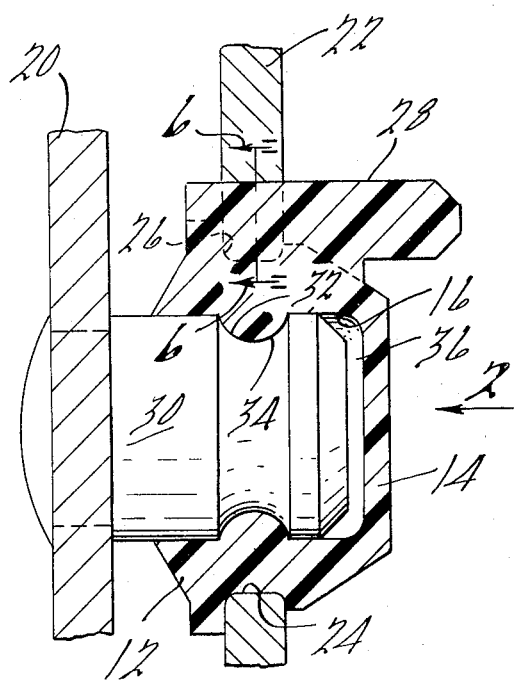
FIG. 1 is a cross-sectional view of the bushing of this invention in assembled relationship interconnecting two motion transmission arms.
Figure 2:
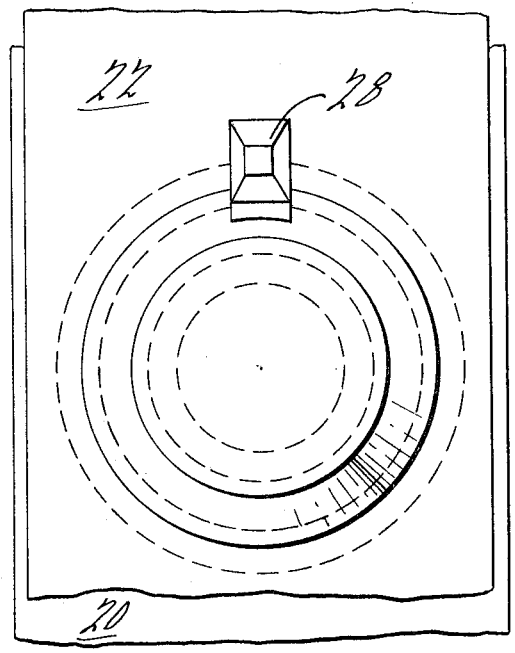
FIG. 2 is a view of the bushing of this invention in assembled relationship with two motion transmissions and looking in the direction of arrow 2 in FIG. 1.

FIG. 1 illustrates the bushing of this invention interconnecting two windshield wiper transmission linkage members 20 and 22. The bushing is pushed into an aperture 24 provided in link 22 and is securely retained in place by means of an annular groove 26 which is formed in the bushing body intermediate the bushing end portions 12, 14. The bushing body itself is fabricated from a resilient material such as urethane or rubber and, hence, the groove easily grips the wall of the aperture and is dimensioned so as to accommodate slight tolerance variations in the thickness of the link member. An indexing key 28 is provided on the bushing to insure that the bushing is properly orientated in the aperture 24.

Figures 3, 4, 7:
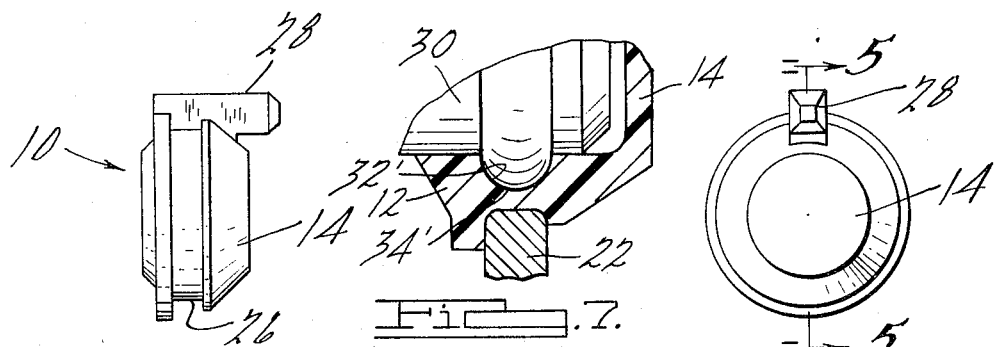
FIG. 3 is a view in side elevation of the bushing of this invention.
FIG. 4 is a front view of the bushing shown in FIG. 3.
FIG. 7 is a partial cross-sectional view similar to FIG. 1 illustrating a second embodiment of the invention.

Again, with reference to FIG. 1, it is seen that windshield wiper transmission link 20 is provided with a shaft or stud 30. Link 20 is thus interconnected with link 22 by journaling stud 30 in the bore of the bushing 10. While not essential to this invention, stud 30 can be provided with a groove 32 for cooperating with an annular rib 34 formed on the wall of bore 16 of the bushing, intermediate its end portions. It will be understood that the cooperating rib and groove can be reversed so that the rib is formed on the stud, with the groove provided in the bushing. This embodiment is shown in FIG. 7 wherein an annular rib 34' is provided on stud 30 and a cooperating groove 32' is formed in the bushing. To increase durability and manufacturing ease, internal rib 34 and external bushing groove 26 can be formed in overlying relationship to provide for uniform wall thickness in the bushing.

It will be noted with reference to FIG. 1 that insertion of stud 30 into the bore of the bushing causes the resilient seal lip 18 to flex outwardly and come into sealing engagement with the surface of the stud 30. Thus, it is seen that the seal prevents passage of water or dirt into the interior of the bushing. Inasmuch as bushing end portion 14 caps the other end of the bore, the bushing and stud wear surfaces are completely protected.

In practice it has been found helpful to place a lubricant in the bore of the bushing prior to journaling the stud therein and due to the cup-shaped bore, the lubricant can be deposited in the bushing at the source of its manufacture and the pre-lubricated bushing shipped for subsequent installation into the windshield wiper assembly. In this regard, it will be observed in FIG. 1 that a lubricant chamber 36 can be provided in end portion 14 of the bushing by simply controlling the length of the stud 30.

Thus, a bushing is provided which functions as an excellent connecting device and which is simple to manufacture and employ. The bushing provides for secure interconnection and smooth relative motion between the connected parts as it seals against entry of water and dirt thereby preventing rust and corrosion.

While a preferred embodiment of this invention has been described, it will be apparent that other embodiments can be conceived without departing from the spirit and scope of this invention. Such other embodiments are to be deemed as included with the scope of the following claims.

We claim:

1. In a windshield wiper system employing motion transmitting linkage interconnected by journaling a stud of one linkage member within a bushing carried by a second linkage member, an improved linkage coupling arrangement for accommodating canting and rotational movement as between the interconnected linkage members, said linkage coupling arrangement comprising a first linkage member having an aperture therethrough, a resilient one-piece bushing having a body portion with oppositely disposed first and second end portions and an annular groove extending transversely about the outer surface of said body intermediate said bushing end portions, said bushing being located in the aperture of said first linkage member and retained therein by engagement of said first linkage member in said bushing groove, a bore in said bushing body extending through the first end portion and terminating adjacent the second end portion such that said second end portion defines an integrally formed cap of said bore, a stud projecting from the second of the linkages being interconnected and journaled in the bore of said bushing, and a seal surface in the first end portion of said bushing, said seal being formed by varying the diameter of said bore to provide a tapered surface capable of making sealing contact with said stud.

2. The linkage coupling arrangement of claim 1 wherein one of said stud and bushing is provided with an annular groove intermediate its end portions and the other of said stud and bushing is provided with an annular rib intermediate its end portions, said rib and groove being capable of cooperating to assist retention of said stud when journaled within said bushing.

3. The linkage coupling arrangement of claim 2 wherein said bushing is a polyurethane material.

* * * * *